Oct. 22, 1929.   F. DESSAUER ET AL   1,732,715
ELECTROMAGNETIC INDUCTION APPARATUS
Filed Jan. 15, 1924
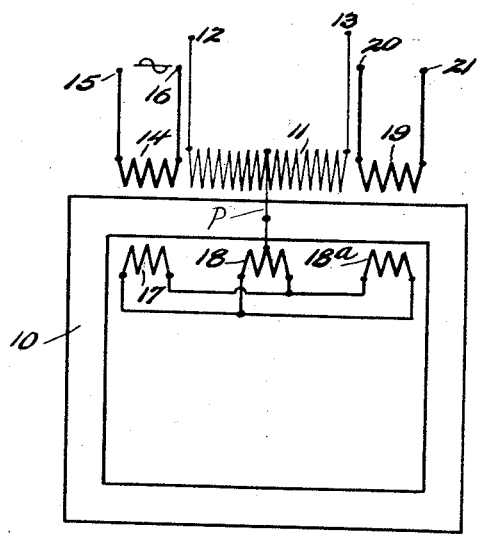
Inventor
F. Dessauer,
W. Petersen,
and Edward Welter,
By Watson, Coit, Morse & Grindle
Attorney Patented Oct. 22, 1929

1,732,715

UNITED STATES PATENT OFFICE

FRIEDRICH DESSAUER AND WALDEMAR PETERSEN, OF FRANKFORT-ON-THE-MAIN, AND EDUARD WELTER, OF DARMSTADT, GERMANY

ELECTROMAGNETIC INDUCTION APPARATUS

Application filed January 15, 1924. Serial No. 686,441.

This invention relates to electromagnetic induction apparatus, particularly to transformers adapted to be used in high tension systems such as are described in No. 1,523,367, dated January 13, 1925, the application for which was filed April 9, 1921, by the present applicants. This application is a continuation in part of that earlier application.

In transformers, and particularly in auto-transformers wherein the primary and secondary coils are wound side by side or around different portions of the core instead of encircling the same portion of the core, the opposing magnetic fields caused by the two coils cause a large amount of flux leakage between the windings. That is part of the flux generated or induced by the primary winding does not link the secondary winding, but is scattered or dispersed outside of the core. Thus the quantity of mutual flux, that is the flux which induces current in the secondary winding is greatly reduced, lowering the voltage induced in the secondary winding and thus impairing the efficiency and operating characteristics of the transformer. This loss of voltage becomes considerable in the case of an auto-transformer which has a very high ratio of transformation, such as is used in the system above referred to.

The principal object of the present invention is to provide means for compensating or equalizing the flux in a magnetic circuit, and particularly to compensate for flux leakage or equalize the flux in a transformer of the character referred to.

This and other objects will be apparent from the annexed description and from the accompanying drawing, the single figure of which represents one embodiment of the invention as applied to a transformer.

As illustrated, the transformer comprises a closed magnetic core 10, a high tension winding 11, having terminals 12 and 13, and a low tension winding 14 having terminals 15 and 16. The points 12 and 16 may or may not be connected as desired. Assume that 14 is excited from any suitable source of alternating current. A magnetic field of definite strength dependent on the excitation will be set up in the core. If now the winding 11 is connected to some translating device, so that a current flows therein, a magnetic field will be set up in the core which tends to oppose the field induced by 14. More current will now flow in 14, assuming the exciting voltage is constant, to overcome this opposing field. This results in flux leakage between the two windings, which reduces the mutual flux linking both 14 and 11.

To compensate for this leakage we place a winding 17 of any suitable number of turns on the core at the portion occupied by 14, so that all the flux passing through 14 passes through 17. If current is allowed to flow in 17, this current will be proportional to the flux linkage. On the portion of the core occupied by the winding 11, we place a winding 18 preferably similar to, that is, having the same number of turns as, the winding 17. 17 and 18 are connected in series, so that the same current flows in each. Then the flux induced in the core by 18 is proportional to the current, that is, equal to the flux linking 17. Consequently the same amount of flux will link the two coils 14 and 11, compensating for flux leakage produced by the opposing fields.

If desired, we may use a second low tension winding 19, having terminals 20 and 21, and connect 20 and 13, or not, as may be expedient. The winding 19 is a secondary winding and is particularly adapted for furnishing the exciting current for a second transformer to be connected in series with the winding 11, as is described in the application above referred to. In such case the flux linking 19 may be boosted or brought up to the value of that linking 14 by a compensating coil 18$_a$ connected either in series or in parallel with 18. It is desirable that the coils 17, 18, 18$_a$ all have equal magnetomotive forces or ampere-turns. As the windings 17 and 18 and also the winding 18$_a$ are tightly wound on the iron core 10, they have the same potential as this core. The determined potential can also be imparted to core 10 and windings 17, 18, 18$_a$ by a separate connection $p$, which connects them to a point, preferably the mid-point, of the high-tension winding 11.

It is to be understood that the invention is not limited, either in structure or application, to the particular details which have been selected for the sake of illustration, but includes modifications which fall within the scope of the appended claims.

Having thus described the invention what is claimed as new and desired to be secured by Letters Patent is:

1. In a device of the class described, in combination, a magnetic circuit, means inductively associated with one portion of the circuit for inducing a magnetic field therein, means inductively associated with another portion of the circuit in which said field is adapted to induce current, and means for compensating for flux leakage comprising current generating means inductively associated with the first portion of the circuit and a source of magneto-motive force connected thereto and inductively associated with the second portion of the circuit.

2. In a device of the class described, in combination, a magnetic core, a winding on one portion thereof adapted to induce a field therein, a winding on another portion of the core in which winding the field is adapted to induce a current, and means for compensating for flux leakage comprising a winding placed on the first portion of the core adapted to have current induced therein, and a similar winding placed on the second portion of the core and connected in series with said last mentioned winding.

3. A transformer comprising in combination, a core, primary and secondary windings thereon, and an additional winding on the core divided into two spaced sections connected in series and adapted to equalize the flux in the core.

4. In a transformer, in combination, a magnetic core and means for causing equal amounts of magnetic flux to traverse different portions of the core comprising a winding on one portion of the core and a similar winding on another portion of the core, said windings being so proportioned as to have substantially equal magneto-motive forces said windings being connected in series.

5. In a transformer, in combination, a core, a primary coil disposed on one portion thereof, a secondary coil disposed on another portion thereof, and means for equalizing the flux in said coils comprising a winding adapted to be traversed by all of the flux linking the primary coil, and a second winding so proportioned and connected to the first winding as to have an equal magneto-motive force, said second winding being placed so that all the flux induced by it links the secondary winding.

6. A high tension transformer system comprising in combination a low-tension winding and a high-tension winding, wound the one at the side of the other, an iron core insulated from the earth and from the low tension winding, and means for reducing the loss from dispersion between the primary and secondary coils consisting of a plurality of coils arranged one at each point of different magnetization of the iron core and connected with one another so that a more strongly induced coil transmits magnetizing current to a less strongly induced coil.

7. In a transformer, in combination, a core, a primary winding thereon, a secondary winding on another portion of said core and a third winding thereon divided into two sections connected in series, each of said sections being closely coupled magnetically with one of the aforementioned windings.

8. In combination, a magnetic circuit, means for creating a flux in said circuit, means for producing a current from said flux, and means for compensating for flux leakage in said circuit, including electrically connected windings inductively coupled to said flux-creating and current-producing means.

In testimony whereof we affix our signatures.

WALDEMAR PETERSEN.
FRIEDR. DESSAUER.
EDUARD WELTER.